(12) United States Patent
Lyall

(10) Patent No.: US 7,146,658 B2
(45) Date of Patent: Dec. 12, 2006

(54) POOL SKIMMER

(75) Inventor: Douglas Frank Rea Lyall, Westville (ZA)

(73) Assignee: David Travis Rea Lyall, Salt Rock (ZA), part interest (*) Notice: Subject to any disclaimer, the term of this patent is extended or adjusted under 35 U.S.C. 154(b) by 293 days.

(21) Appl. No.: 10/477,162

(22) PCT Filed: May 7, 2002

(86) PCT No.: PCT/IB02/01531

§ 371 (c)(1),
(2), (4) Date: Nov. 7, 2003

(87) PCT Pub. No.: WO02/090690

PCT Pub. Date: Nov. 14, 2002

(65) Prior Publication Data

US 2004/0154092 A1 Aug. 12, 2004

(30) Foreign Application Priority Data

May 8, 2001 (ZA) .................................. 2001/3715
Nov. 23, 2001 (ZA) .................................. 2001/9667

(51) Int. Cl.
*E04H 4/00* (2006.01)
(52) U.S. Cl. .................. 4/508; 4/490; 4/507; 4/512
(58) Field of Classification Search .................. 4/490, 4/506–512; 210/122, 123, 129, 167–169
See application file for complete search history.

(56) References Cited

U.S. PATENT DOCUMENTS

| 4,746,424 A | * | 5/1988 | Drew ............................. 4/490 |
| 4,802,592 A | * | 2/1989 | Wessels ......................... 4/490 |
| 5,078,863 A | | 1/1992 | Durigon ...................... 210/123 |
| 5,133,854 A | * | 7/1992 | Horvath ......................... 4/490 |
| 5,269,913 A | * | 12/1993 | Atkins ............................ 4/490 |
| 6,027,641 A | | 2/2000 | Spradbury et al. .......... 210/169 |
| 6,187,181 B1 | * | 2/2001 | Stoltz et al. ................... 4/490 |

* cited by examiner

*Primary Examiner*—Khoa D. Huynh
(74) *Attorney, Agent, or Firm*—Wood, Herron & Evans, LLP

(57) ABSTRACT

The invention relates to a pool skimmer including first and second tubular members that are telescopically displaceable with respect to one another, flotation means for suspending it substantially vertically in a body of water, and a tubular connector mounted on the second tubular member in liquid communication with a space defined within the tubular members and defining connector formations for connecting it in line with a hose of a pool pump. In operation in a body of water, the pump creates suction in the tubular connector and surface water flows via a weir defined by the top of the first tubular member, into the said space, via the tubular connector, and into the pool hose. The tubular members define in their side walls apertures that increasingly come into register as overlap of the members increase, thereby permitting water to flow via the apertures directly into the said space.

13 Claims, 4 Drawing Sheets

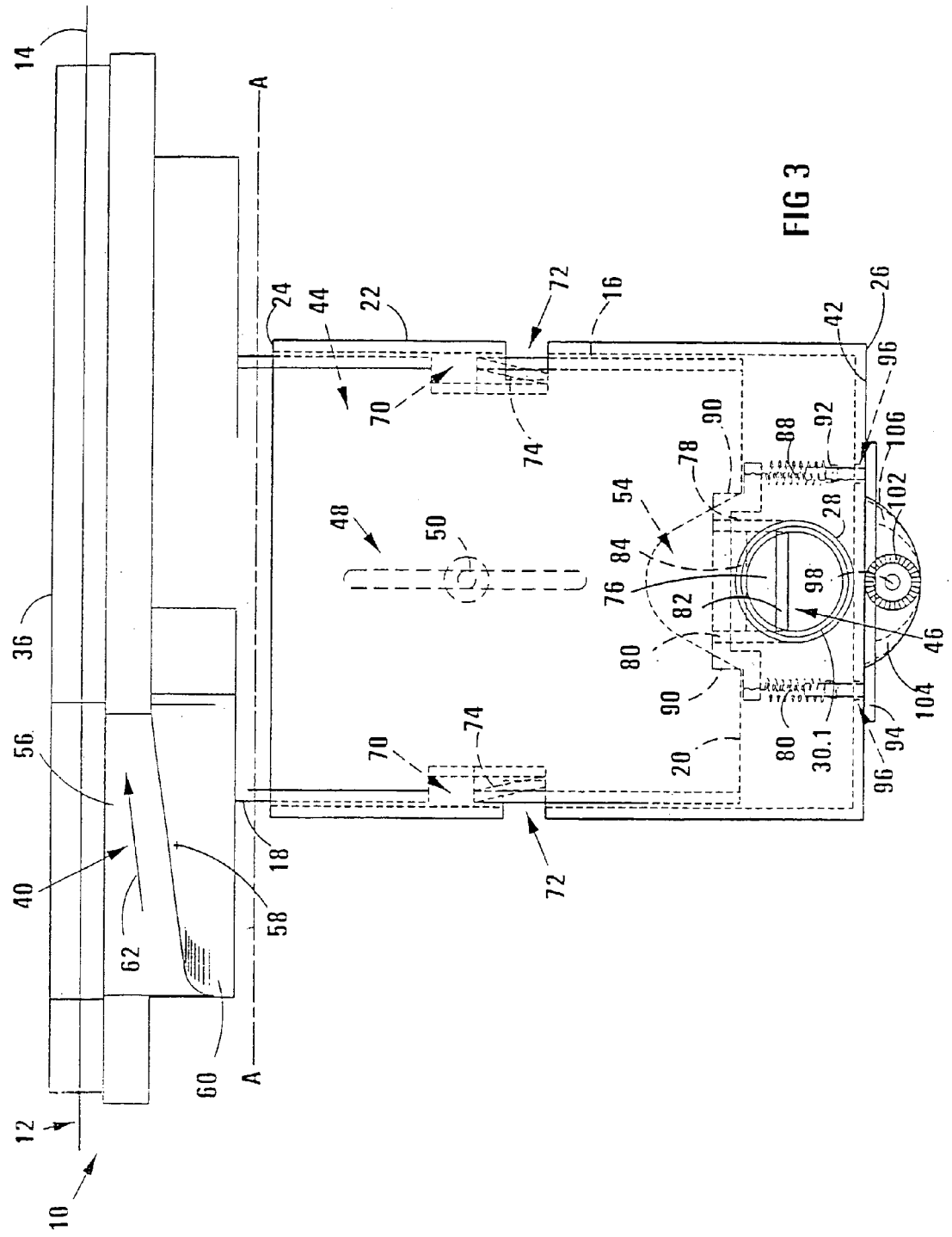

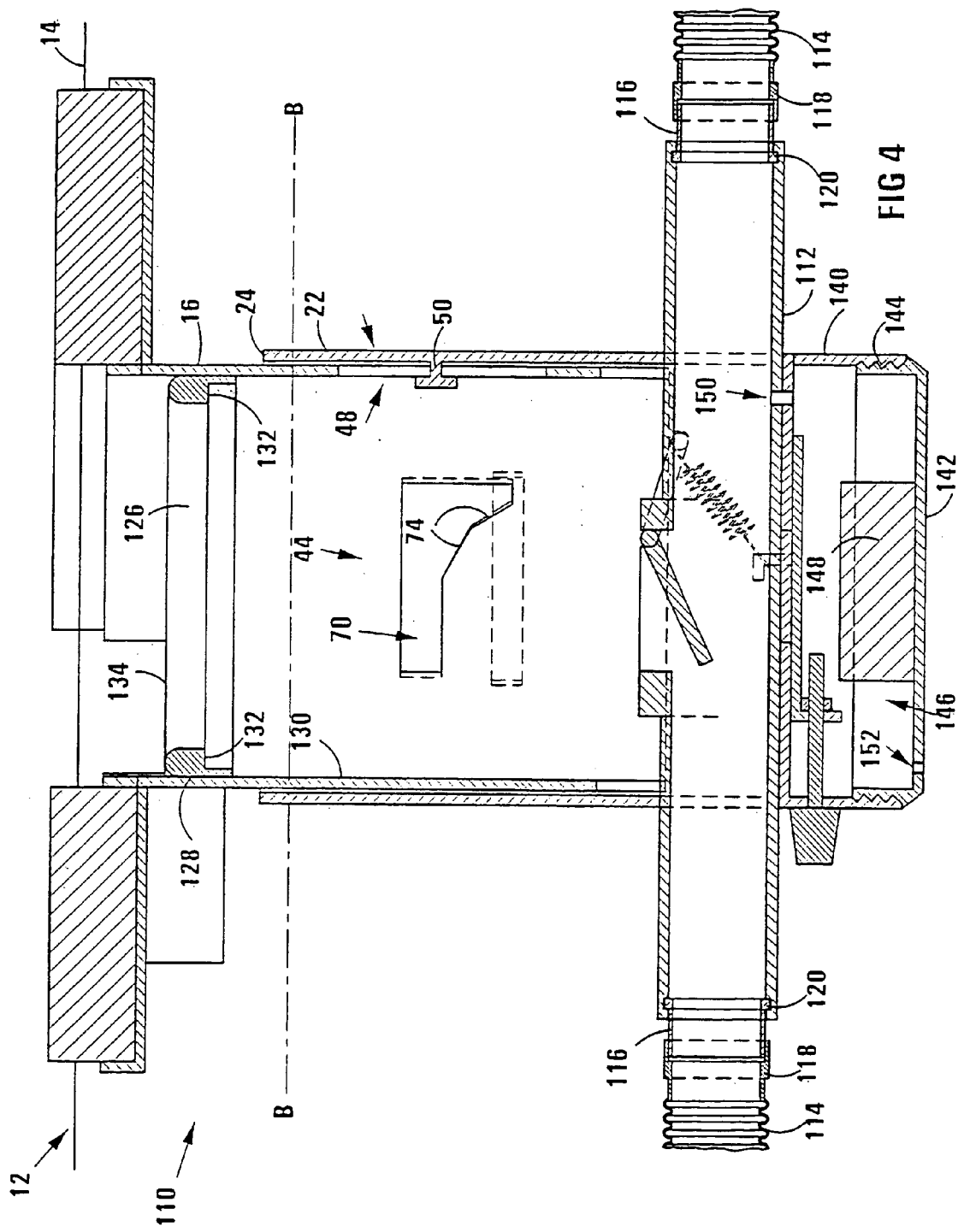

POOL SKIMMER

CROSS REFERENCE TO RELATED APPLICATIONS

This application is a U.S. National Phase of PCT Serial No. PCT/IB02/01531 filed May 7, 2002, which is hereby expressly incorporated by reference herein.

THIS INVENTION relates to a pool skimmer.

A pool skimmer as herein envisaged comprises a device that can gather and hence remove floating debris from the water surface of a swimming pool. The pool skimmer of the invention operates particularly in conjunction with an automatic pool cleaner of the type that is propelled by the displacement of water therethrough and where this water displacement is provided for by the connection of the pool cleaner to the suction side of a pool filter pump associated with the pool in which the pool cleaner is to be used, particularly via a hose comprising a plurality of interconnected hose segments. Any reference hereinafter to a hose of an automatic pool cleaner accordingly must be interpreted as a reference to a hose of the type referred to above. A pool filter pump generally is associated with a debris trap for trapping debris so as to prevent it from entering the pool filter pump.

According to the invention there is provided a pool skimmer, which comprises a first tubular member defining an operative top end and an operative bottom end and having flotation means located thereon for suspending the tubular member in a floating configuration and in a substantially vertical orientation in a body of water at a level at which the said top end of the tubular member can serve as a weir for surface water of the body of water to flow over and into the tubular member;.

a second tubular member defining an operative top end and an operative bottom end and that is located in a telescopically displaceable configuration with respect to the first tubular member, the operative bottom end of the second tubular member extending beyond the operative bottom end of the first tubular member and including an end wall, at the said bottom end; and a tubular connector defining two ends and an aperture at a location between the said two ends, the tubular connector being mounted on the second tubular member, in a configuration in which the aperture therein is in liquid communication with the internal space defined within the tubular members, and defining connector formations at its opposite ends that permit connection in line with a hose of an automatic pool cleaner.

All references herein to a tubular member must be understood to be references to an elongate hollow member of any suitable cross-sectional profile that will accommodate the features of the present invention.

The pool skimmer may have a flow control valve for controlling the flow of water through the aperture defined in its tubular connector. The flow control valve may include a flap-like closure member for the aperture defined at a location between the opposite ends of the tubular connector which is pivotally connected at an edge thereof to the remainder of the pool skimmer near the said aperture and is pivotally displaceable with respect to the remainder of the pool skimmer between various positions, each position being associated with a particular magnitude of projection of the flap-like member into the passage defined through the tubular connector, the flap-like member having biassing means for biassing it towards its position of minimum projection into the passage defined in the tubular connector. In this configuration, the effective cross-sectional area of a flow passage defined between the space defined within the tubular members at a location downstream of the said aperture will be determined by the position of the flap-like member. Also in this configuration, the flow of water through the tubular connector from one end thereof to the other will operatively be increasingly restricted with increasing projection of the flap-like member into the passage defined in the-tubular connector. The biassing means of the flap-like member may include at least one spring, such as a coil spring, a leaf spring, and the like.

In the operative configuration of the pool skimmer of the invention in a body of water, in which the opposite ends of the tubular connector are connected in line with the hose of an automatic pool cleaner and in which the first tubular member floats within the body of water at the level as defined, displacement of water through the hose and hence through the tubular connector will induce water within the internal space defined within the tubular members to flow into a flow line within the said tubular connector and hose via the flow passage defined through the aperture defined between the opposite ends of the tubular connector, this displacement of water inducing the flow of water over the top end of the first tubular member. The flow of water over the top end of the first tubular member will cause debris floating on the body of water to gather towards the first tubular member and hence to flow into the first tubular member and, thereby, the second tubular member, from where it can be displaced via the hose to the debris trap associated with the pool filter pump to which the automatic pool cleaner is effectively connected. Should debris be trapped against the closure member of the aperture defined between the ends of the tubular connector, the closure member may, under fluid pressure, be displaced to a position of increased projection into the passage defined in the tubular connector to increase the effective cross-sectional area of the flow passage defined between the space defined within the tubular members at a location downstream of the said aperture, thus permitting the debris to be displaced past the closure member.

The flotation means of the first tubular member particularly may comprise at least one body of a low density material located on the first tubular member near the operative top end thereof. The flotation means may, alternatively, comprise at least one body defining therein a cavity containing air.

The operative top end of the first tubular member particularly may define a weir formation that defines a weir level disposed operatively beneath the remainder of the top end of the tubular member, the floating configuration of the first tubular member as determined by the flotation means particularly being such that flow of water into the first tubular member will occur only via the said weir formation. For this configuration tubular member, the body forming the flotation means may define a channel formation which forms an extension of the weir formation through which water must flow into the first tubular member. The first tubular member also may define two or more similar weir formations.

The pool skimmer of the invention further may include guide means for guiding relative telescopic displacements of the tubular members with respect to one another and also for serving as stop means for preventing separation of the tubular members. The tubular members particularly may be displaceable with respect to one another between two limit positions, which determine effectively the maximum and the minimum overlap of the tubular members with respect to one another.

Each of the first tubular member and the second tubular member further may define an aperture therein, the apertures being disposed to increasingly overlap with one another and thereby be in register with one another as the second tubular member approaches it maximum overlap position with respect to the first tubular member, in use of the pool skimmer.

A first configuration of the pool skimmer of the invention provides for the tubular connector to be disposed externally of the second tubular member and operatively beneath the end wall thereof, for which configuration the aperture defined between the two ends of the tubular connector communicates with an aperture defined in the end wall of the second tubular member. A second configuration of the pool skimmer of the invention provides for the tubular connector to be partially located within the second tubular member with its ends projecting through opposite sides of the side wall of the second tubular member, for which configuration the aperture defined between the two ends of the tubular connector communicates directly with the space defined inside the tubular members.

The connector formations defined at the opposite ends of the tubular connector may be adapted to cooperate with complementary connector formations defined by opposite hose segment ends of the hose in line with which the connector is connected, in use of the pool skimmer. The tubular connector may incorporate at least one joint formation that permits relative rotation of a connector formation with respect to remainder of the tubular connector.

The pool skimmer may include a chemical dispenser housing defining therein an internal space in which at least one chemical, such as chlorine, and the like, may be housed, the said housing defining therein at least one passage through which the said internal space will be in liquid communication with a body of water, in the operative configuration of the pool skimmer in the body of water, for dispensing the chemical into the body of water. The dispensing housing may be attached to the operative bottom end of the second tubular member. The internal space defined within the dispenser unit may be in liquid communication with the passage defined within the tubular connector via an outlet passage defined in the wall of the said tubular connector, and, in the operative configuration of the pool skimmer in a body of water, in communication with the body of water directly via an inlet passage defined in the housing. The configuration of the chemical dispenser housing, in operation of the pool skimmer, permits the displacement of water from the body of water, via the inlet passage, through the said internal space, via the outlet passage, and into the flow stream inside the tubular connector, thus permitting dispensing of a chemical housed in the housing into the body of water.

The first tubular member of the pool skimmer may have a vortex dissipater formation defining an operatively generally downward facing surface extending along an inner surface of the first tubular member and orientated approximately perpendicularly with respect to the inner surface of the first tubular member. In the case of the first tubular member being a round cylindrical member, the vortex dissipater member may be an annular formation defining a peripheral surface, as aforesaid. The annular formation may be formed separately from the first tubular member and may be configured to fit snugly into it. The annular formation may define an operative top peripheral edge. The said peripheral edge may sit prone of a weir formation defined by the first tubular member and defining a weir level disposed operatively beneath the remainder of the top end of the tubular member, as aforesaid. Alternatively, the said top peripheral edge of the annular formation may be disposed at a level operatively not above the said weir formation. The said top peripheral edge of the annular formation may be rounded so as to provide for a smoothened flow of water over the said edge.

Further features of the invention, including the operation thereof, are described hereinafter with reference to two examples of pool skimmers, in accordance with the invention, illustrated in the accompanying diagrammatic drawings. In the drawings.

FIG. 3 shows a diagrammatic elevation of the pool skimmer of FIG. 1, as viewed from the line III—III of FIG. 2 in the direction of the accompanying arrows hidden details generally being shown only below the line A—A; and FIG. 4 shows a diagrammatic sectional elevation of a second embodiment of a pool skimmer, in accordance with the invention, hidden details generally being shown only below the line B—B.

Figure 1:
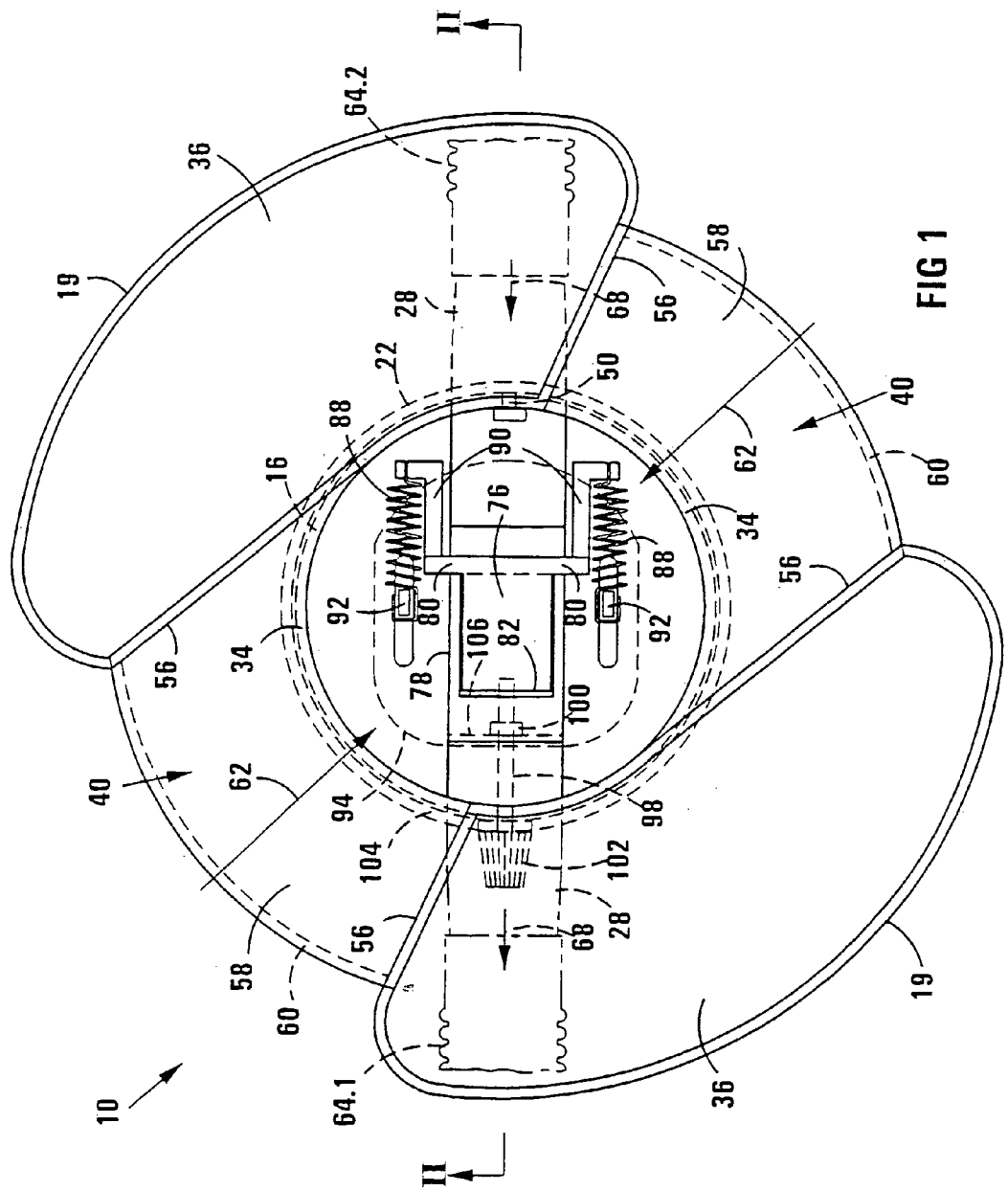
FIG. 1 shows a diagrammatic plan view of a first embodiment of a pool skimmer, in accordance with the invention, floating in operation in a body of water.
Figure 2:
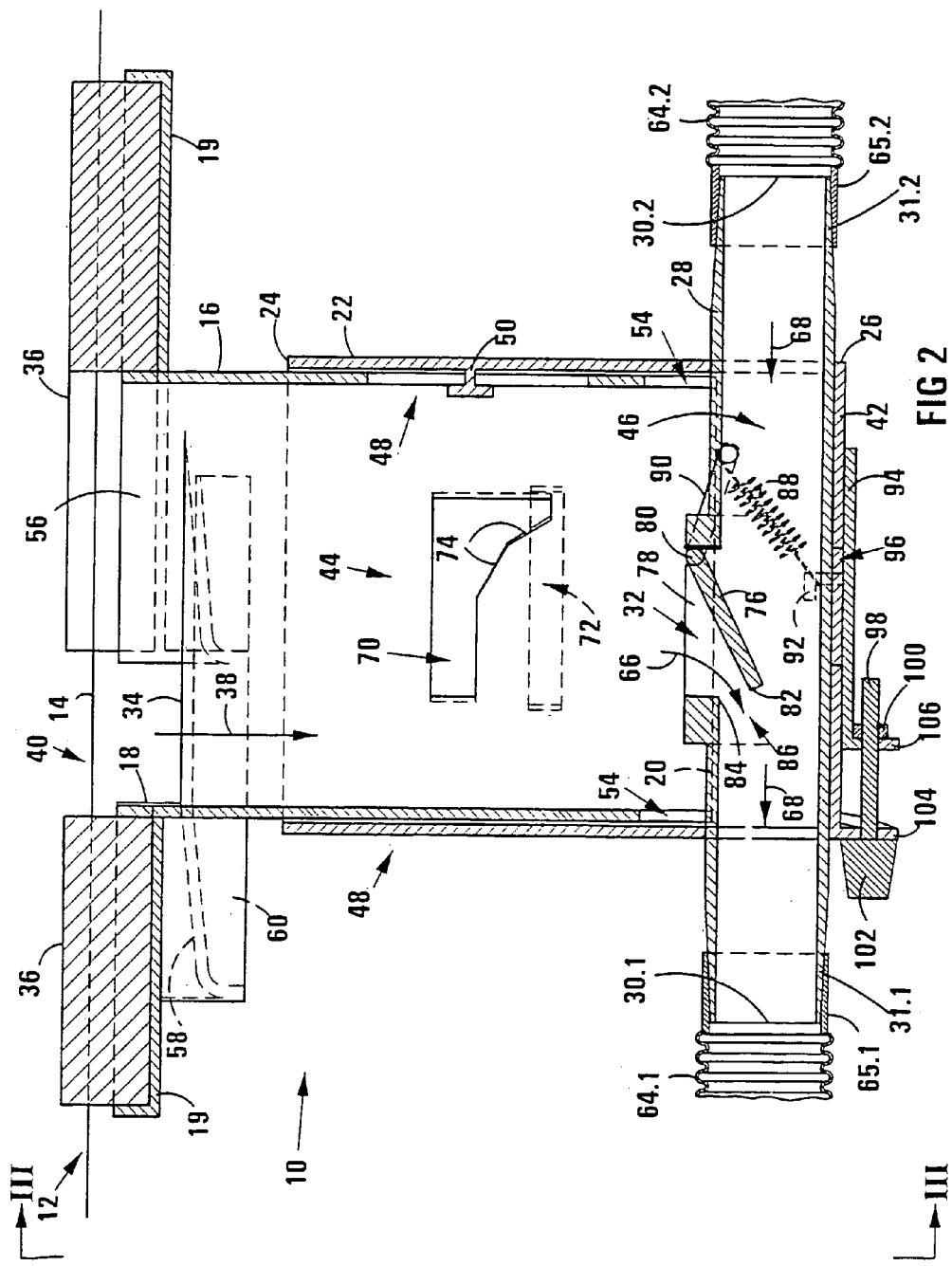
FIG. 2 shows a diagrammatic sectional elevation of the pool skimmer of FIG. 1, along the line II—II of FIG. 1 and as viewed in the direction of the accompanying arrows.

In FIGS. 1 to 3, a first embodiment of a pool skimmer, in accordance with the invention, is designated generally by the reference numeral 10. The pool skimmer 10 is shown floating in a body of water 12 (see FIGS. 2 and 3) in a conventional-type swimming pool (not shown in detail), which has a water level 14 (see FIGS. 2 and 3). The swimming pool has a conventional-type automatic pool cleaner (not shown) for cleaning its side walls and floor and a conventional-type pool filter pump (not shown) for displacing water and thereby propelling the pool cleaner. The pool filter pump is associated with a debris trap. Insofar as the configuration and functioning of a conventional-type automatic pool cleaner and a conventional-type pool filter pump are well known, it will not be elaborated on herein.

With reference particularly to FIG. 2, the pool skimmer 10 comprises a first tubular member 16 defining an operative top end 18 and an operative bottom end 20, a second tubular member 22 defining an operative top end 24 and an operative bottom end 26, and a tubular connector 28 defining two opposite ends 30.1 and 30.2 and an aperture 32 at a location between the said two end. The tubular connector 28 defines tapered connector formations 31.1 and 31.2 at its opposite ends 30.1 and 30.2 to cooperate with matching connector formations defined by a segment of hose of the automatic pool cleaner, as will be described hereinafter.

The operative top end 18 of the tubular member 16 defines two weir formations 34 (only one shown here) that define a weir level disposed operatively beneath the remainder of the top end 18 of the tubular member 16. The tubular member 16 has also flotation means in the form of two floatation foam material bodies 36 located thereon for suspending the tubular member 16 in a floating configuration and in a substantially vertical orientation in the body of water 12 at a level at which water flow (as indicated by arrow 38) into the tubular member 16 will occur only via the said weir formations 34. The bodies 36 are mounted operatively on top of the tubular member 16, particularly partially within two dish-like-formations 19 that are integrally formed with the tubular member 16, and define channel formations 40 which form extensions of the respective weir formations 34 and through which water must flow in order to enter the tubular member 16.

The tubular member 22 is located in a telescopically displaceable configuration with respect to the tubular member 16, the operative bottom end 26 of the modular member 22 extending beyond the operative bottom end 20 of the tubular member 16 and including an end wall 42 at the said bottom end 26. The tubular members 16 and 22 together define within them an internal space 44. The tubular connector 28 defines therein a flow passage 46.

With reference particularly to FIG. 3, the pool skimmer 10 includes also guide means comprising a guide slot 48 defined in the wall of the tubular member 22 and a cooperating guide formation 50 projecting from the tubular member 16 and slidably located within the guide slot. The said guide means guides relative telescopic displacements of the tubular members 16 and 22 with respect to one another and also serve as stop means for preventing separation of the tubular members 16 and 22. Particularly, the said guide means provides for the tubular members 16 and 22 to be displaceable with respect to one another between two limit positions, which determine effectively the maximum and minimum overlap of the tubular members with respect to one another. It furthermore prevents rotation of the said tubular members with respect to one another. The tubular member 16 defines near its bottom end 20 two recesses 54 for accommodating the tubular connector 28 when the tubular members 16 and 22 are displaced towards their maximum overlap position with respect to one another.

With reference particularly to FIG. 1, each channel formation 40 each is defined on its sides by the bodies 36 and wall portions 56 and on its bottom by a sloping base wall 58. Curved walls 60, which operatively peripherally depend from the base walls 58, assist in directing water flow over the base walls 58, as indicated by the arrows 62.

With reference again particularly to FIG. 2, in the operative configuration of the pool skimmer 10 shown in FIGS. 1 and 2, its tubular connector 28 is connected in line with a pool hose 64 of the automatic pool cleaner (not shown) including a first hose segment 64.1 and a second hose segment 64.2. The first hose segment 64.1 is connected at its one end to the connector formation 31.1 defined at the end 30.1 of the tubular connector 28 via a complementary connecting formation 65.1 defined by the hose segment 64.1 and at its other end to another hose segment (not shown) which, in turn, is connected to the pool filter pump (not shown). A second hose segment 64.2 is connected at its one end to the connector formation 31.2 defined at the end 30.2 of the tubular connector 28 via a complementary connecting formation 65.2 defined by the hose segment 64.2 and at its other end to another hose segment (not shown) which, in turn, is connected to the pool cleaner (not shown).

In this configuration, when the pool filter pump is activated, displacement of water through the hose 64, and hence through the tubular connector 28, will induce water within the internal space 44 defined within the tubular members 16 and 22 to flow, as indicated by the arrow 66, into a flow line, indicated by arrows 68, within the tubular connector 28, via the aperture 32, this displacement of water inducing the flow, as indicated by arrow 38, of water over the weir formation 34 of the top end 18 of the tubular member 16. The flow, as indicated by arrow 38, of water over the weir formations 34, causes any debris (not shown) floating on the body of water 12 to gather towards the tubular member 16 and then to flow, as indicated by arrow 38, into the tubular member 16 and, thereby, the tubular member 22, from where it is displaced via the aperture 32, the tubular connector 28, and the hose segment 64.1 to the debris trap (not shown) associated with the pool filter pump (not shown) to which the pool cleaner (not shown) is effectively connected.

The tubular members 16 and 22 further define two pairs of apertures (only one pair shown here), each pair comprising an aperture 70, defined by the tubular member 16, and an aperture 72, defined by the tubular member 22, the apertures in each pair being disposed to increasingly overlap with one another and thereby be in register as the tubular member 22 approaches its maximum overlap position with respect to the tubular member 16, in use of the pool skimmer 10.

During operation of the pool skimmer 10, the internal space 44 defined by the tubular members 16 and 22 at times will be substantially filled with water due to the flow, as indicated by arrow 38, of water over the weir formation 34. In this situation, the tubular member 22 will be near its lowest operative level, being its minimum overlap position with the tubular member 16. If a blockage or a partial blockage of water flow occurs in the hose segment 64.2 or at the automatic pool cleaner (not shown), the result will be that more water will be drawn from the internal space 44, causing a drop in water level inside the tubular members 16 and 22. Due to the effect of buoyancy the tubular member 22 will be displaced upwardly with respect to the tubular member 16 until the apertures 70 and 72 are at least partially in register, causing water to flow from the body of water 12, through the portions of apertures 70 and 72 that are in register, and into the internal space 44. Such inflow will prevent air being sucked into the aperture 32 from where it might otherwise have traveled via the hose segment 64.1 to the pool filter pump (not shown), where it might cause damage due to the pump running dry. The aperture 70 is defined in a shape, as shown, that has tapering portions 74 near its lower end, providing for progressive intake of water through the said apertures 70 and 72 as they increasingly overlap with one another.

With reference still particularly to FIG. 2, the pool skimmer 10 includes further a flow control valve comprising a closure member in the form of a flap-like member 76, for controlling the flow of water through the aperture 32. The member 76 is located within a matching housing portion 78 that is integrally formed with the tubular connector 28. The member 76 is pivotally connected at an edge thereof to the housing portion 78 via a pivotal connection 80 located near the aperture 32. The member 76 defines an edge 82 remote from the pivotal connection 80 and the housing portion 78 defines an edge 84. The member 76 is shown in a first position, in which a flow passage 86 is defined between the edge 84 and the edge 82 and through this passage water may pass from the space 44, as indicated by the arrow 66. The member 76 is pivotally displaceable operatively downwardly from its first position to increase the effective cross-sectional area of the passage 86 to allow for debris, which may be trapped against the closure member, to be displaced past the member 76. In its first position, the member 76 projects into the passage 46 defined in the tubular connector by a certain amount. If the member 76 is displaced downwardly therefrom, it will project into the passage 46 by an increased amount, thereby increasingly restricting the flow of water through the said passage (see arrows 68) and increasing also the suction exerted on water contained in the space 44 defined in the tubular members 16 and 22.

The closure member 76 has biassing means in the form of two coil springs 88 (only one shown here) for biassing it towards its first position. Each coil spring 88 is connected at its one end to an end of a lever formation 90, which is integrally formed with the flap-like member 76, and defines a first order lever formation therewith, and at its other end to a hook-like anchor formation 92. The anchor formations 92 are integrally formed with an anchor plate 94 that is slidably located against the base wall. 42 of the tubular member 22. Each anchor formation 92 protrudes through a slot 96 defined in the base wall 42 and into the space 44 defined in the tubular members 16 and 22 and in this space it is connected to an end of the coil spring 88. An adjustment screw comprising a bolt 98 and a nut 100 provides for the adjustment of the tension in the coil springs 88. The bolt formation 98 has a head formation 102 by means of which it may be manually rotated. The head formation 102 and the nut 100 abut against formations 104 and 106, respectively, which are integrally formed with the base wall 42 of the tubular member 22 and the anchor plate 94, respectively. By rotating the head 102 clockwise, the nut 100, and consequently also the anchor plate 94, is displaced towards the head 102. The anchor plate 94 slides relative to the base wall 42 whilst the anchor formations 92 slide within the slot formations 96, thereby increasing the tension in the coil springs 88. Conversely, if the head 102 is rotated anti-clockwise, the anchor formations 92 are displaced so as to relieve the tension in the coil spring 88. The force exerted by the coil springs 88 on the anchor formations 92, and consequently on the anchor plate 94, hold the anchor plate snugly against the base wall 42, thereby causing the anchor plate 94 to seal off the slots 96 and preventing water from being sucked through them.

In FIG. 4, a second embodiment of a pool skimmer, in accordance with the invention, is designated generally by the reference numeral 110. The pool skimmer 110 is in many respects similar to the pool skimmer 10 of FIGS. 1 to 3. Like features, where designated, are therefore designated again by the same reference numerals as before and a description of these features may be found in the description hereinabove of FIGS. 1 to 3.

The pool skimmer 110 includes a tubular connector 112 which is connected at opposite ends thereof to two hose segments 114 via connector formations 116 defined by the tubular connector 112 and complementary connector formations 118 defined by the hose segments 114. The tubular connector 112 incorporates two joint formations 120 that permit relative rotation of the connector formations 116, and therewith relative rotation of the hose segments 114 also, with respect to the remainder of the tubular connector 112. This mode of connection will ensure that the tubular members 16 and 22 remain in the required vertical orientation while floating in a body of water and, thereby, that the operation of the pool skimmer 110 is not. affected by undue tilting of the said tubular members.

The tubular member 16 has a vortex dissipater formation in the form of an annular formation 126, which is formed separately of the tubular member 16. The annular formation 126 defines a cylindrical outer surface 128, which provides a snug fit between the annular formation 126 and an inner surface 130 of the tubular member 16. The annular formation 126 defines a downwardly facing peripheral surface 132 that is orientated perpendicularly with respect to the inner surface 130 of the tubular member 16, the surface 132 serving as a vortex dissipater. The annular formation 126 defines also a rounded top peripheral edge 134, of which the top edge operatively is located on the same level as the weir formation 34. The rounded shape of the peripheral edge 134 provides for smooth flow of water over the weir formations 34 and the annular formation 126. The annular formation 126 operatively minimises the risk of air being sucked into the tubular connector 112 through the formation of a vortex within the internal space 44.

The pool skimmer 110 includes near its operative bottom end a tubular extension portion 140 to which is connected a chemical dispensing housing 142 via matching screw thread formations 144 defined by the portion 140 and the housing 142. The housing 142 and the portion 140 together define within them a space 146 in which a chlorine pill 148 is located, in use of the pool skimmer. A passage 150 is defined between the passage 46 defined within the tubular connector 112 and the space 146. A passage 152 is defined between the body of water 12 and the space 146. In the operative configuration of the pool skimmer 110 in which the pool filter pump (not shown) to which the pool skimmer is effectively connected, is activated, water is displaced from the body of water 12, via the passage 152, through the space 146, via the passage 150, and into the flow line defined within the tubular connector 112, towards the pool filter pump. This flow of water past the chlorine pill 148 will cause chlorine to be dispensed into the pool. In an alternative configuration (not shown), the passage 152 may be associated with a flow control valve for controlling the flow of water therethrough.

It is submitted that the pool skimmer of the invention provides an effective means for skimming debris from the water surface of a swimming pool and insofar as it will randomly travel across the surface of the water, together with an automatic pool cleaner to which it is effectively connected, it is ensured that debris is efficiently trapped and removed.

The invention claimed is:

1. A pool skimmer, which comprises
    a first tubular member defining an operative top end and an operative bottom end and having flotation means located thereon for suspending the tubular member in a floating configuration and in a substantially vertical orientation in a body of water at a level at which said top end of the tubular member serves as a weir for surface water of the body of water to flow over and into the tubular member;
    a second tubular member defining an operative top end and an operative bottom end and that is located in a telescopically displaceable configuration with respect to the first tubular member, the operative bottom end of the second tubular member extending beyond the operative bottom end of the first tubular member and including an end wall at said bottom end;
    a tubular connector in the form of a tube defining two ends and an aperture in the tube wall at a location between said two ends, the tubular connector being mounted on the second tubular member in a configuration in which the aperture is in liquid communication with an internal space defined by the tubular members, the two ends of the tubular connector each defining a connector formation that extends operatively outwardly from the second tubular member and that permit connection of the tubular connector in line with a hose of an automatic pool cleaner; and
    a flow control valve that controls the flow of water through the aperture in the tubular connector.

2. A pool skimmer as claimed in claim 1, in which the flow control valve includes a flap-like closure member, for the aperture defined at a location between the two ends of the tube forming the tubular connector, and said flap-like closure member is pivotally connected at an edge thereof to the remainder of the pool skimmer near said aperture and is pivotally displaceable with respect to the remainder of the pool skimmer between various positions, each position being associated with a particular magnitude of projection of the flap-like member into a passage defined in the tubular connector, the flap-like member having biassing means for biassing said flap-like member towards its position of minimum projection into the interior of the passage defined in the tubular connector.

3. A pool skimmer as claimed in claim 1, in which the flotation means includes at least one low density body located on the first tubular member near its operative top end.

4. A pool skimmer as defined in claim 1, in which the first tubular member defines a weir formation that defines a weir level disposed below the top end of the tubular member, the floating configuration of the first tubular member as determined by the flotation means particularly being such that flow of water into the first tubular member will occur only via said weir formation.

5. A pool skimmer as claimed in claim 4, wherein the flotation means comprises a body which defines a channel formation which forms an extension of the weir formation through which water must flow into the first tubular member.

6. A pool skimmer as claimed in claim 1, which includes guide means for guiding relative telescopic displacements of the tubular members with respect to one another and also serves as stop means which effectively determines the minimum overlap of the tubular members with respect to one another, thereby preventing separation of the tubular members.

7. A pool skimmer as claimed in claim 1, in which each of the first tubular member and the second tubular member defines an aperture therein, the apertures being disposed to increasingly overlap with one another and thereby be in registration with one another as the second tubular member approaches its maximum overlap position with respect to the first tubular member.

8. A pool skimmer as claimed in claim 1, in which the tubular connector is partially located within the second tubular member with its ends projecting through opposite sides of the side wall of the second tubular member, the aperture defined between the ends of the tubular connector communicating directly with the internal space defined by the tubular members.

9. A pool skimmer as claimed in claim 1, which the tubular connector incorporates at least one joint formation that permits relative rotation of the connector formation with respect to the remainder of the tubular connector.

10. A pool skimmer as claimed in claim 1, which includes a chemical dispenser housing defining therein an internal space in which at least one chemical, such as chlorine, may be housed, said housing defining therein at least one passage through which said internal space will, in the operative configuration of the pool skimmer in a body of water, be in liquid communication with the body of water for dispensing the chemical into the body of water.

11. A pool skimmer as claimed in claim 10, in which the internal space defined within the dispenser unit is in liquid communication with the passage defined within the tubular connector via an outlet passage defined in the wall of said tubular connector, and, in the operative configuration of the pool skimmer in body of water, in communication with the body of water directly via an inlet passage defined in the housing.

12. A pool skimmer as claimed in claim 1, which includes a vortex dissipater formation defining an operatively generally downward facing surface extending along an inner surface of the first tubular member at a location near its operative top end and oriented approximately perpendicularly with respect to the inner surface of the first tubular member.

13. A pool skimmer as defined in claim 12, in which the first tubular member is a round cylindrical member and the vortex dissipater formation is an annular formation.

\* \* \* \* \*